(12) United States Patent
Ion (10) Patent No.: US 12,509,930 B2
(45) Date of Patent: Dec. 30, 2025

(54) DOOR CONTROL SYSTEM (71) Applicant: ICONTROLS INC., Richmond Hill (CA)

(72) Inventor: Grigore Ion, Richmond Hill (CA)

(*) Notice: Subject to any disclaimer, the term of this patent is extended or adjusted under 35 U.S.C. 154(b) by 324 days.

(21) Appl. No.: 18/130,590

(22) Filed: Apr. 4, 2023

(65) Prior Publication Data
US 2023/0323717 A1 Oct. 12, 2023

Related U.S. Application Data (60) Provisional application No. 63/328,004, filed on Apr. 6, 2022.

(51) Int. Cl.
E05D 13/00 (2006.01)
E05F 15/686 (2015.01)

(52) U.S. Cl.
CPC ........ *E05D 13/1215* (2013.01); *E05F 15/686* (2015.01); *E05Y 2400/40* (2013.01); *E05Y 2400/506* (2013.01); *E05Y 2800/236* (2013.01); *E05Y 2800/244* (2013.01); *E05Y 2900/106* (2013.01); *E05Y 2900/132* (2013.01)

(58) Field of Classification Search
CPC ........... E05F 15/77; E05F 15/41; E05F 15/44; H02P 21/14; H02P 21/18; H02P 3/06; H02H 7/0851
See application file for complete search history.

(56) References Cited

U.S. PATENT DOCUMENTS

2019/0323279 A1* 10/2019 Buescher ................ H02P 21/14

* cited by examiner

Primary Examiner — Said Bouziane
(74) Attorney, Agent, or Firm — Norton Rose Fulbright Canada LLP (57) ABSTRACT A door control system is provided. The control system includes a controller configured to control a door via a motor. The motor is powered by a battery and bypasses the controller via relays and/or switches when power to the controller is disconnected. The current of the motor may be monitored and/or displayed to confirm that the door is balanced.

15 Claims, 9 Drawing Sheets

DOOR CONTROL SYSTEM

CROSS-REFERENCE TO RELATED APPLICATIONS

This application claims priority to U.S. Provisional Patent Application No. 63/328,004, filed on Apr. 6, 2022, the contents of which are incorporated by reference in their entirety.

FIELD

This relates to doors and in particular to automated door control systems.

BACKGROUND

Doors are common and come in many forms. Some doors open on a vertical axis of rotation (e.g. entrances into rooms). Other door types, such as so-called "garage doors", include a plurality of panels and open by being moved along a track. For example, a "garage door" may be opened manually by applying a force to one or more panels of the door at one or more locations on the door to cause the door to move along the track in either direction.

Automated systems may be used to open and close, or otherwise control, various types of doors. For example, automated door control systems often use AC motors for garage door opening systems. In such systems, the AC motor pulls a belt or other connector which is connected directly or indirectly (e.g. via a drive shaft and/or cables) to one or more panels of the garage door, thereby imparting a tensile force via the connector.

However, such automated systems required complicated control systems to activate the AC motor, and are vulnerable to power failures and other interruptions.

Accordingly, it would be beneficial to alleviate one or more of the above-noted challenges.

SUMMARY

According to an aspect, there is provided a method of balancing a door control system having a motor coupled to a door, the method comprising: receiving, at a controller for controlling the motor, a command for actuating said motor to move in a first direction; actuating said motor to move in said first direction; detecting a first electrical current used by the motor during said moving in said first direction; receiving, at said controller, a command for actuating said motor to move in a second direction opposite to said first direction; actuating said motor to move in said second direction; detecting a second electrical current used by said motor during said moving in said second direction; determining whether said door control system is balanced based on said first electrical current and said second electrical current.

According to another aspect, there is provided a door control system having a motor coupled to a door, the system comprising: a door comprising one or more panels; a motor coupled to said door; a controller configured to: receive a command for actuating said motor to move in a first direction; actuate said motor to move in said first direction; detect a first electrical current used by the motor during said moving in said first direction; receive a command for actuating said motor to move in a second direction opposite to said first direction; actuate said motor to move in said second direction; detect a second electrical current used by said motor during said moving in said second direction; and determine whether said door control system is balanced based on a magnitude of said first electrical current and said second electrical current.

Other features will become apparent from the drawings in conjunction with the following description.

BRIEF DESCRIPTION OF DRAWINGS

In the figures which illustrate example embodiments.

DETAILED DESCRIPTION

Figure 1A:
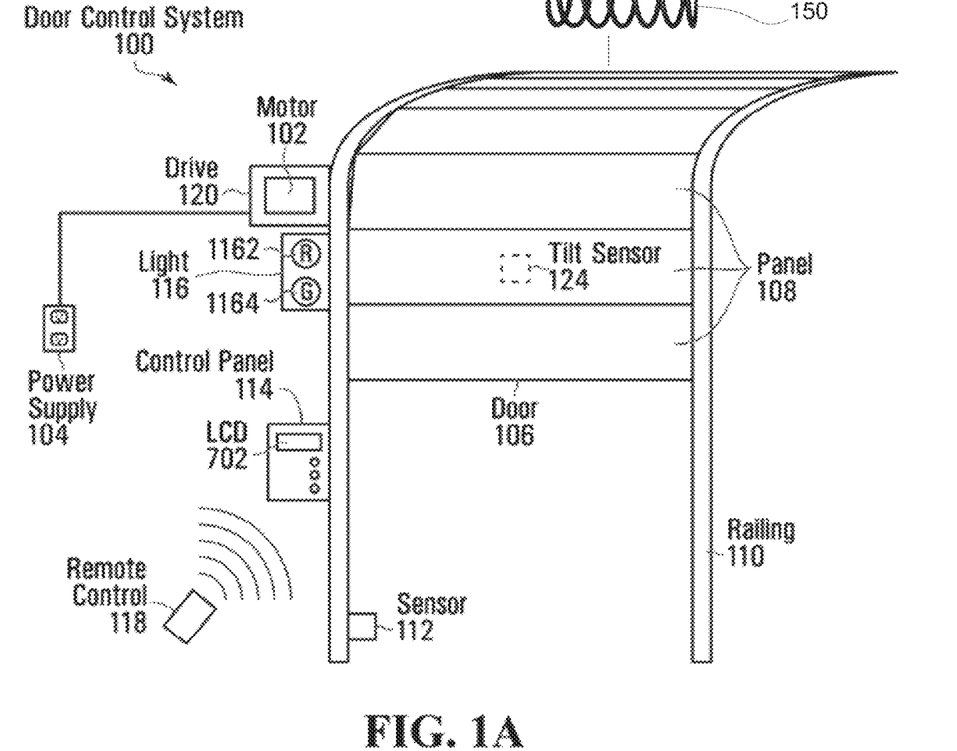
FIG. 1A is a schematic diagram showing components of an example door control system.

FIG. 1A is a schematic diagram showing components of an example door control system. As depicted, door control system 100 includes a door 106 comprising a plurality of panels 108. In some embodiments, though not depicted in FIG. 1, door 106 might include one panel. Door 106 is slidingly or rotatably connected to railing 110, which provides a path for door 106 or panels 108 of door 106 to move up or down along the track provided by railing 110. In some embodiments, such motion may occur via bearings which allow for rotation along railing 110.

Also depicted is drive 120, which includes motor 102. In some embodiments, motor 102 is a DC motor. In some embodiments, motor 102 is a brushed DC motor. In some embodiments, the drive 120 and motor 102 form part of an integrated package. In other embodiments, the drive 120 may be separate from motor 102. Motor 102 is coupled to one or more panels of door 106, such that actuation of motor 102 causes door 106 to move along railing 110. Door 106 may move in a first direction (e.g. vertically upward along the vertical section of railing 110) or a second direction (e.g. vertically downward along the vertical section of railing 110).

Motor 102 may be controlled by drive 120. Drive 120 may be a DC drive. That is, drive 120 may be a DC motor speed control system. The speed of a DC motor may be directly proportional to armature voltage and inversely proportional to motor flux (which is a function of field current), and as such, armature voltage and/or field current may be used to control the speed of a DC motor. Drive 120 may provide the requisite electronics to provide fine control over the speed of rotation and direction of motor 102. In some embodiments, drive 120 is located at a vertical height which is out of reach of human operators (e.g. 8 feet or even higher). This may enhance the safety of door control system 100, as higher voltages and currents are kept out of reach from human operators, and from children.

Figure 7:
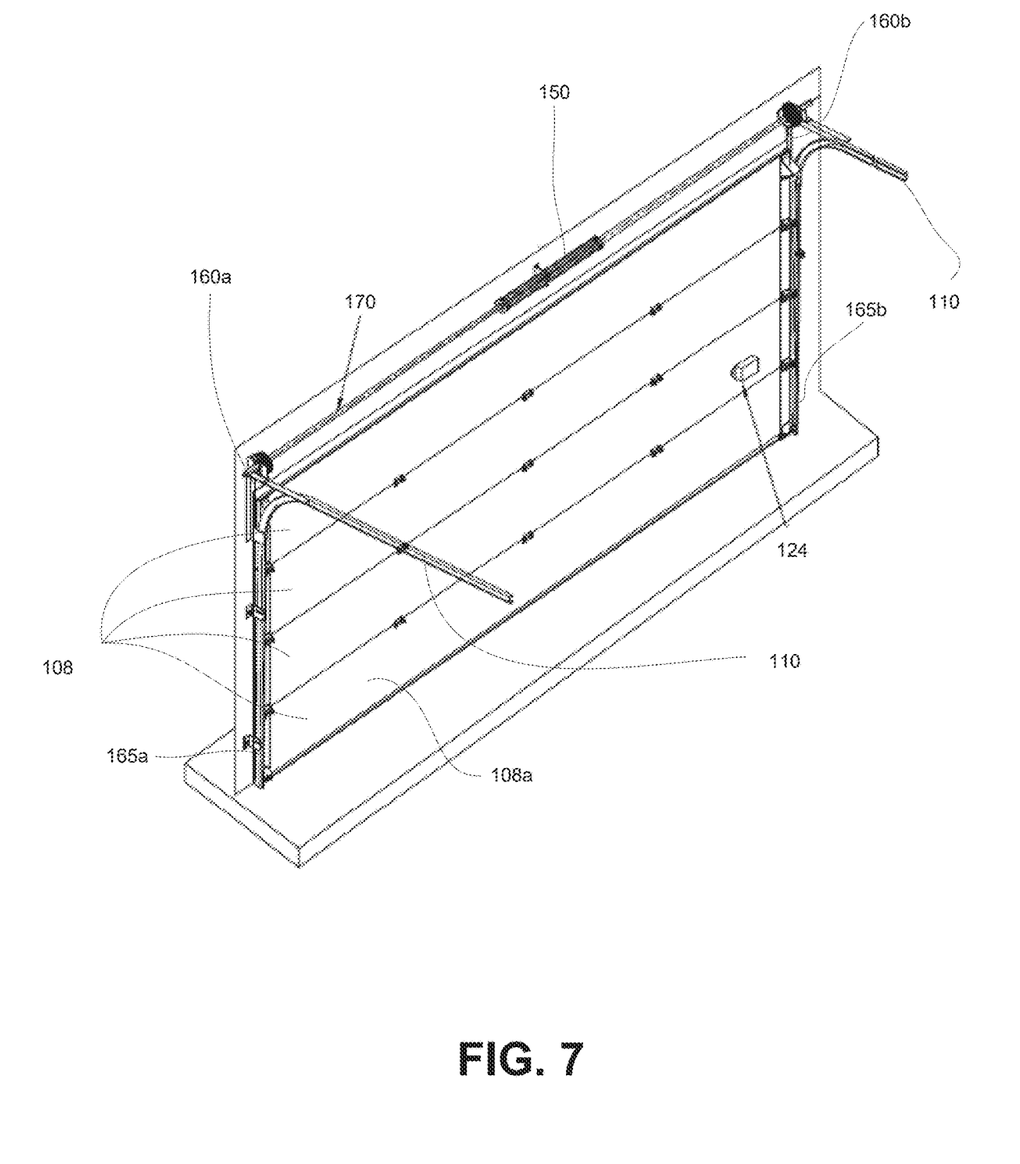
FIG. 7 is a simplified diagram showing components of an example door control system.

As depicted in FIGS. 1 and 7, spring 150 may provide a tensile force to door 106 which may reduce or "balance" the mass of door 106. That is, although door 106 may have a mass in excess of 50 kilograms (which may be a significant load for motor 102 to pull against the force of gravity), spring 150 may exert a force on door 106 via door shaft 170 which reduces the net gravitational force of door 106. In some embodiments, spring 150 may be a torsion spring, an extension spring, or any suitable spring which can be rotated or compressed to store elastic potential energy. In some embodiments, spring 150 may apply a biasing force to door shaft 170. In some embodiments, door shaft 170 is coupled to said door 106 via one or more cables at one or more respective locations on panels 108 of said door 106.

The motor 102 may be coupled to door 106 in any number of ways. For example, as depicted in FIG. 7, motor 102 may be coupled to the door panel 108 via door shaft 170 and a plurality of ropes or cables 160a, 160b, which are fastened to a panel 108 of door 106, such that actuation of motor 102 causes the cable 160 to exert an upward force to pull door 106 up, and actuation of motor 102 in the reverse direction reduces the tension in the cable 160 and allows the downward force exerted by gravity to guide the door 106 in a downward direction. For example, in some embodiments, a first rope or cable may be connected to one side of a panel 108, and a second rope or cable may be connected to a second side of the panel 108, as depicted in FIG. 7. Such configurations may be useful for distributing the force and torque exerted by the motor 102 on drive shaft 170 in a more balanced way across multiple locations 165a, 165b on the panel 108, such that the risk of a panel becoming crooked, skewed or jammed is reduced during lifting. It will be appreciated that the aforementioned embodiment is merely an example and that in other embodiments, more than two ropes or cables 160, or one single rope or cable 160 may be used to couple motor 102 to door 106. In some embodiments, spring 150 may provide a biasing force to door 106, in order to reduce the amount of force necessary to be exerted by motor 102 (and therefore the amount of tension experienced in cables 160a, 160b) to effect vertically upward movement of door 106. In some embodiments, spring 150 may provide a biasing force to drive shaft 170 which is less than the weight of the door, such that the lowering the door may be accomplished with minimal work by motor 102 (aside from allowing for movement, rather than restricting cables 160a, 160b). In other embodiments, motor 102 may engage one or more wheels coupled to the door 106, such that rotation of motor 102 in either direction causes door 106 to move up or down, respectively.

Drive 120 may receive commands from control panel 114. Control panel 114 is coupled to drive 120 and includes a plurality of buttons or other inputs. For example, as depicted, control panel includes an LCD display, an 'open' button 304, a 'close' button 306, and a 'stop' button 308. Engaging any of buttons 304, 306, 308 causes a control signal to be sent to drive 120 to control the operation of motor 102. As depicted, control panel 114 may include a transceiver which is configured to communicate with remote control 118. Remote control 118 may be used by a user to control door 106 when located remote from buttons 304, 306, 308.

Also depicted is optional light 116. Light 116 includes at least one visual indicator which may indicate a mode of operation of the door control system 100. As depicted, light 116 includes a red light 1162 and a green light 1164. In some embodiments, green light 1164 is illuminated when the door 106 is stationary. In some embodiments, red light 1162 is illuminated when the door 106 is in motion. In some embodiments, red light 1162 may intermittently flash while door 106 is in motion. Door control system 100 may also include an audio output device (not shown) which may be configured to, for example, output an audible sound while a particular light is illuminated or flashing. Audio device may output multiple different sounds in different situations (e.g. when door 106 is being opened, when door 106 is being closed, when an error condition is detected, or the like). Although light 116 is depicted as having two lights 1162, 1164, it will be appreciated that light 116 may include less than two lights (e.g. a single LED or other device capable of emitting multiple different colours) or more than two lights.

Figure 1B:
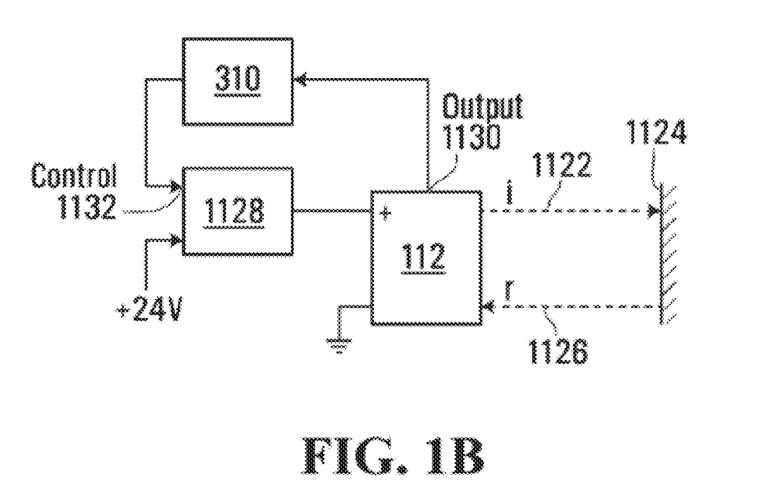
FIG. 1B is a simplified diagram depicting operation of an example photo eye sensor.

Door control system 100 may also include sensor 112, which is located near the floor. In some embodiments, sensor 112 is a photo eye sensor configured to detect the presence of an object. For example, if a person or another object is located in the path of door 106, the sensor 112 detects the presence of this object and prevents door 106 from being lowered, thus avoiding potential injury to the person, damage to the object, and damage to the door 106. FIG. 1B is a simplified schematic diagram depicting operation of a photo eye sensor. In some embodiments, a photo eye sensor may operate by emitting incident electromagnetic radiation 1122 (e.g. visible light, or the like) directed at a polarized reflecting surface 1124. A photodetector 1134 in the photo eye sensor may detect the reflected light 1126 to cause an output signal 1130 from the photo eye sensor indicative of a clear path between the sensor and the reflecting surface 1124. If an obstacle is placed between the light emitter 1136 and the reflecting surface 1124, the reflected light 1126 may either not be detected by the sensor, or be received at an unexpected time, or with an unexpected polarization. Such deviations in the properties of the reflected light compared to the expected reflected light properties may cause the photo eye sensor to output a signal 1130 indicative of an object being present between the light emitter 1136 and the reflecting surface 1124.

As depicted in FIG. 1B, in some embodiments, sensor 112 may be powered via a controllable switch 1128. For example, as depicted, controller 310 may provide a signal to switch 1128 which may change the output of the switch from +24V (or any suitable voltage) to 0 V. As such, controller 310 may be configured to exercise control over the power source provided to sensor 112. In some embodiments, controller 310 may be configured to receive output signal 1130 from sensor 112, as described in further detail below.

Door control system 100 may further include tilt sensor 124. In some embodiments, tilt sensor 124 is an accelerometer configured to detect changes in orientation. Tilt sensor 124 may be used, for example, to detect if door 106 is misaligned. Such misalignment may be indicative of damage to the door (e.g. if a vehicle has driven into and dented door 106). In some embodiments, the output data from tilt sensor 124 may be used by control panel 114 to prevent movement of door 106 if the output indicates that door 106 is misaligned. In some embodiments, red light 1162 may flash when a misalignment of the door 106 is detected.

Door control system 100 is connected to power supply 104. In some embodiments, a connection to power supply 104 includes a connection to a wall outlet providing AC currents and voltages. In embodiments using AC power, the system 100 may include one or more rectifier circuits for converting AC to DC to at the desired voltage and/or current for operation of one or more of drive 120, DC motor 102, control panel 114, sensor 112 and tilt sensor 124.

Figure 2A:
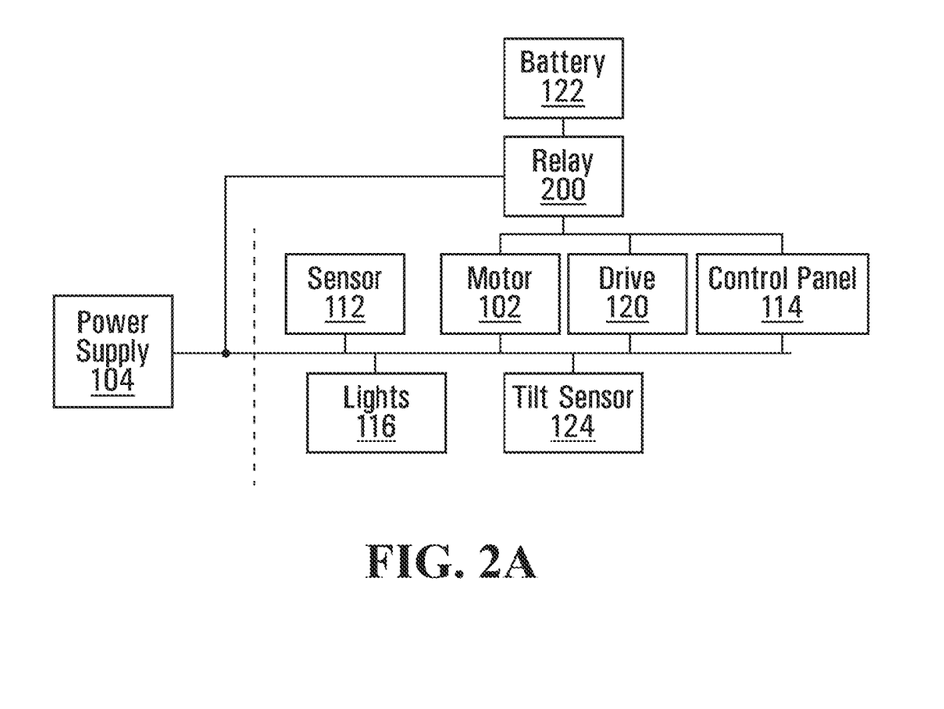
FIG. 2A is a block diagram showing electronic components of the door control system of FIG. 1A.

FIG. 2A is a block diagram illustrating electronic components of the door control system 100 of FIG. 1A. As depicted, power supply 104 powers each of motor 102, drive 120, sensor 112, tilt sensor 124, lights 116, and control panel 114. In some embodiments, the AC power from power supply 104 is rectified prior to reaching the other components. In some embodiments, the control system 100 includes a sensor for verifying the locked/unlocked position of a mechanical door lock.

Door control system 100 also includes battery 122. Battery 122 is configured to provide DC voltage and current to system 100 in the event that power supply 104 is interrupted or unavailable. Battery 122 is connected to motor 102, drive 120 and certain components of control panel 114 via one or more relays 200. Relay 200 is energized by power supply 104, such that relay 200 acts as an open switch when power supply 104 is connected, ensuring battery 122 does not have any electrical connection to motor 102, drive 120 or control panel 114.

Figure 3:
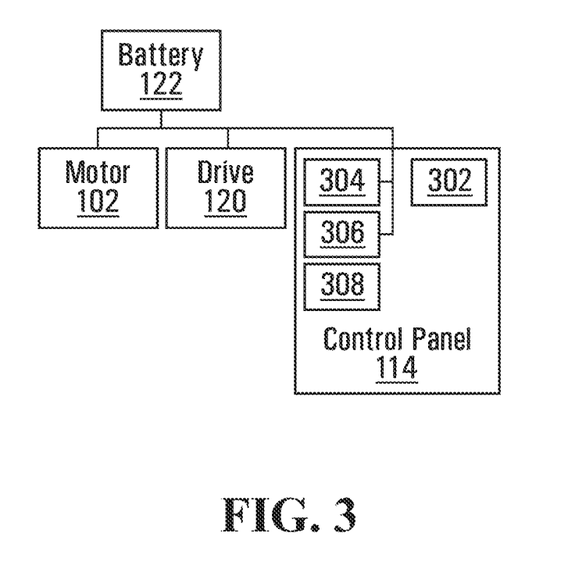
FIG. 3 depicts the electronic configuration of the door control system when the power supply is disconnected.

When power supply 104 is disconnected (e.g. in the event of a lightning strike, or a power failure), relay 200 is no longer energized and assumes a default position as a closed switch. FIG. 3 depicts the electronic configuration of system 100 when power supply 104 is disconnected. As shown, battery 122 provides power to motor 102, drive 120, and to open button 304 and close button 306. Thus, when power supply 104 is disconnected, sensor 112, tilt sensor 124, and lights 116 are not powered, and most of the components in control panel 114 are not powered, with the exception of the open and close buttons 304, 306, and the associated circuitry for transmitting signals from the open and close buttons 304, 306 to the drive 120. Such a configuration may be particularly advantageous for reducing the power consumption from battery 122 during a power outage or interruption. For example, battery 122 provides power to specific components which are necessary to move the door up and down, but not to other components which would increase current draw and power consumption. In particular, the draw on battery 122 may be minimal when movement of door 106 is not required, thus allowing for operation without power supply 104 for much longer periods of time, relative to systems in which backup battery 122 is required to power additional peripherals e.g. sensors, lights, control panels, and the like). When motor 102 is a DC motor, such a configuration may be particularly advantageous, as control of DC motors (and in particular, brushed DC motors) may be less complicated relative to control of AC motors which are typically used. Moreover, power consumption by a brushed DC motor may be quite low, which further enhances the length of time for which battery 122 can be expected to provide power in the event of an outage.

Figure 4:
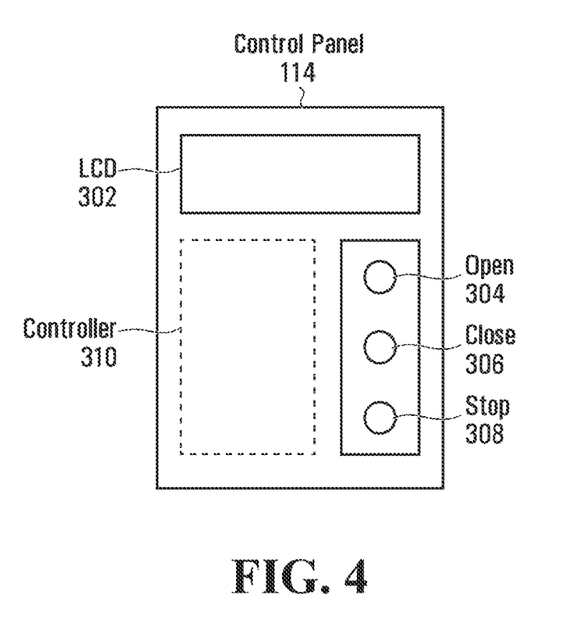
FIG. 4 is a front view of a control panel of an example door control system.

FIG. 4 is a front view of an example control panel 114. As shown control panel includes a display 302, open button 304, close button 306, stop button 308, all of which are connected to controller 310. Controller is operable to receive commands from buttons 304, 306, 308 and send instructions to one or more of display 302 and drive 120. In some embodiments, display 302 is a liquid crystal display (LCD).

Figure 5:
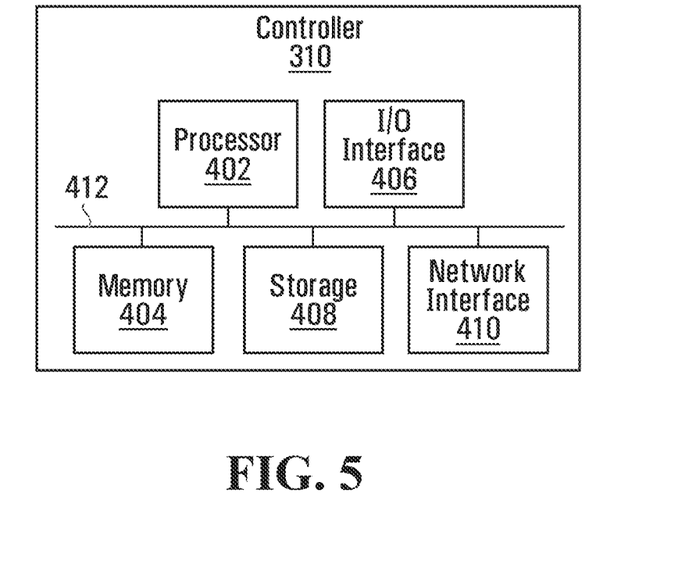
FIG. 5 is a schematic diagram showing components of an example controller.

FIG. 5 is a schematic diagram illustrating components of an example controller 310. As depicted, controller 310 includes one or more processors 402, memory 404, input/output interface 406, storage 408, and network controller 410, which are connected via a bus 412. These components are explained in further detail below. In some embodiments, processor 402 of controller 310 executes instructions stored in memory 404 to implement a door control operating system. In some embodiments, system 100 includes a polarity-independent, two-wire power and communication bus 130 for communication between controller 310 and an encoder which provides reliable position and speed feedback data to the controller 310. In some embodiments, the polarity-independent, two-wire communication bus 130 may be used for communication between any of the control panel 114 and drive 120, as well as control panel 114 and any slave device (e.g. encoders, sensors, peripherals, lights, or the like).

Each of open button 304, close button 306 and stop button 308 are operable to be engaged or activated by a user. In some embodiments, the buttons 304, 306, 308 can be pushed in or depressed for engagement. In some embodiments, the buttons 304, 306, 308 are touch-sensitive buttons. When any of buttons 304, 306, 308 is engaged, a signal is sent to I/O interface 406 of controller 310. The signal(s) from the buttons 304, 306, 308 are received and processed by processor 402 to generate instructions for the drive 120 which controls DC motor 102.

In some embodiments, the controller 310 is programmable to execute predetermined operations based on a particular input or combination of inputs. For example, controller 310 may be configured to respond to a single press of open button 304 by sending a control signal to drive 120 to move door 106 in a first direction for a predetermined amount of time or processor cycles. In some embodiments, the control signal may specify the number of cycles for which the motor 102 should be actuated. The predetermined number of cycles or time period may correspond to a pre-configured change in vertical position for the door 106. Likewise, in some embodiments, controller 310 may be configured to respond to a single press of close button 306 by sending a control signal to drive 120 to move door 106 in a second direction for a predetermined amount of time or processor cycles. In some embodiments, the predetermined amount of time or processor cycles may be substantially the same for both open and close buttons 304, 306. Thus, system 100 is operable to allow a user to configure a preferred height for opening a closed door 106 with a single activation of the open button 304, as well as closing an open door 106 with a single activation of the close button 306. In some embodiments, activating the close button may cause the door 106 to close fully, irrespective of the starting height of the door. This may be achieved, for example, through the use of sensor 112 (e.g. by having sensor 112 positioned at a predetermined height near the ground, and when door 106 is detected by sensor 112, initiating a predetermined number of actuation cycles for motor 102 to by lowered by the remaining distance to the ground).

In embodiments in which the controller 310 is configured to move door 106 in either direction by a predetermined distance, activation of stop button 308 may cause a control signal to be sent to drive 120 which interrupts the current operation and results in motor 102 stopping and the door 106 remaining at its present height at the time of the stop command. In some embodiments, controller 310 may be configured to count the number of cycles which have been carried out for an open or close command, and re-applying the open or close button may result in a resumption of the previously executing open or close command.

In some embodiments, the controller may send individual control signals for each cycle, such that the motor 102 will stop rotating if the control signal from controller 310 to drive 120 is stopped or interrupted.

In some embodiments, the drive 120 may activate motor 102 in accordance with a duty cycle. For example, for each cycle, the motor 102 may be actuated for only a portion of the cycle. This results in the motor moving in 'pulses', as each clock cycle features a period of inactivity and a period of rotation by motor 102. In some embodiments, the speed at which the door 106 is opened or closed may be increased or decreased by modifying the duty cycle. That is, the armature voltage and current flux may be kept constant (thus ensuring the same speed of rotation of the motor 102), and the door may open or close faster because the duty cycle is increased (that is, the pulse of rotation for motor 102 is longer each cycle if the duty cycle is increased). Likewise, the door may appear to rise or fall more slowly if the duty cycle is decreased.

Although duty cycle adjustment may be used as a convenient and simple method for altering the speed of the door 106, it will be appreciated that the speed of motor 102 may also be adjusted by adjusting the armature voltage or current flux in the case of a DC motor.

As noted above, in some embodiments, door control system 100 includes sensor 112. In some embodiments, sensor 112 is a photo eye sensor. Sensor 112 may be any sensor which is configured to detect the presence of an object in close proximity. As depicted in the example configuration shown in FIG. 1A, sensor 112 is affixed to a railing 110 of system 100, normally within a metre or less from the ground. Sensor 112 is configured to detect the presence of an object in close proximity to the sensor 112 (as described, for example, in connection with FIG. 1B). The distance necessary for detection may vary depending on, for example, the scale of the door 106 in a particular application, as well as the particular needs for a system. For example, a door control system 100 being used for the transportation of fragile, expensive goods might use higher detection thresholds than a system used for a storefront.

Sensor is typically placed along railing 110, in a location that allows sensor 112 to detect objects which are in the path of door 106. For example, a box that has been placed in the path of door 106 may be crushed by door 106 if the 'close' mechanism has been engaged by a user. When sensor 112 detects the presence of an object in the path of door 106, sensor 112 may send a signal 1130 to controller 310 indicating that an object is present. Controller 310 may be configured to take particular actions in response to receiving a signal indicative of the presence of an object in the way of door 106. For example, controller 310 may interrupt a 'close' operation if an object is detected. However, if the door control system 100 is currently engaged in an 'open' operation, the controller might not take any additional action when an object is detected by sensor 112 (as the object is unlikely to suffer damage by door 106 if the door is already in the process of being opened and being moved further away from the object).

In some embodiments, controller 310 may be further configured to illuminate one or more of lights 116 and/or sound an audio alert to indicate to nearby users that an object is blocking the path of door 106.

Some door control systems may be required to confirm to regulations and/or standards in order to be acceptable for public consumption. For example, the UL 325 standard is a common safety standard with which some door control systems may be required to comply. In some embodiments, door control system 100 may incorporate specific algorithms in order to comply with various standards. In some embodiments, controller 310 may incorporate such algorithms into operations, such that little or no additional actions are required by the end user in order to comply with various safety standards.

It may be necessary for standard compliance purposes to verify once per cycle that the sensor 112 is functioning correctly. In some embodiments, sensor 112 is powered via a pin on controller 310 (or, as shown in FIG. 1B, by a controllable switch 1128 connected to a power source, which can be turned on and off via a control signal from controller 310). In some embodiments, the controller 310 may provide sensor 112 with a different voltage input relative to other peripherals connected to controller 310 (e.g. 24 Volts).

Figure 6:
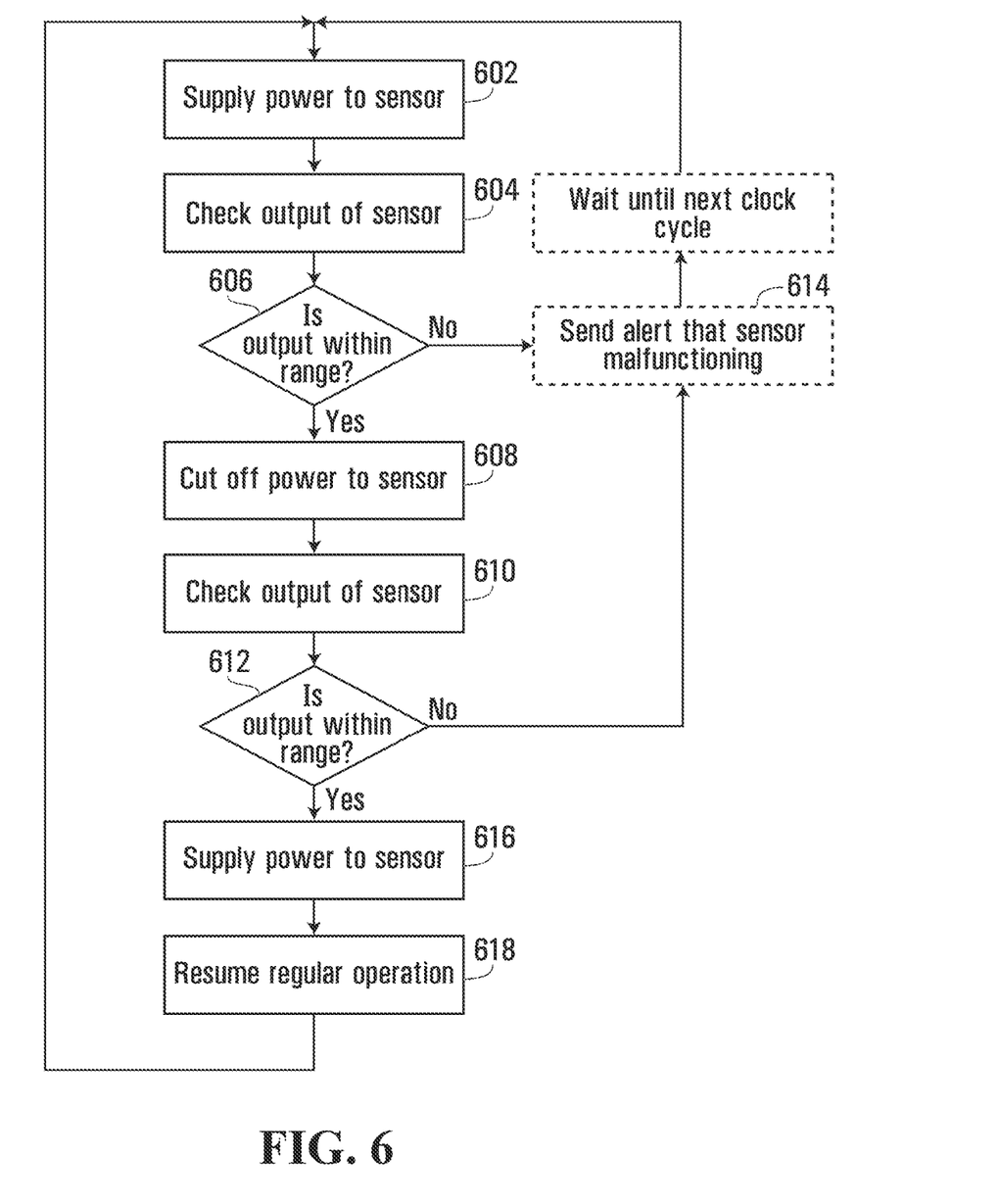
FIG. 6 is a flow chart illustrating an example method of verifying functionality of a sensor.

FIG. 6 is a flow diagram depicting an example method 600 of verifying functionality of sensor 112. In some embodiments, the method 600 is initiated by the controller 310 receiving a command to close door 106 (either via button 306 or a command from remote control 118). At the beginning of each clock cycle, at block 602, controller 310 is configured to supply power (directly or indirectly) to sensor 112. At block 604, controller 310 verifies after a predetermined time period that the output from sensor 112 is within the expected range of outputs for sensor 112 for that time period. For example, if sensor 112 is known to require 16 ms after powering up before an output signal is produced, controller 310 may verify the output signal 1130 at 5 ms (or, for example, any time period in which the sensor 112 can be expected to not yet be outputting an output signal). At 606, if the output of sensor 112 is confirmed to correspond to the sensor 112 not being turned on, the controller 310 may then stop supplying power to sensor 112 at 608. If the output of sensor 112 deviates from the expected value (e.g. if the output signal 1130 corresponds to the sensor 112 being operational), this may indicate that the output signal from sensor 1130 is faulty or that sensor 112 is malfunctioning. In some embodiments, controller 310 may also allow a delay of longer than the powering up period for sensor 112 (e.g. waiting 25 ms and measuring the output signal from a sensor which requires 16 ms to power on fully), and may also confirm that the output 1130 from sensor 112 is within expected ranges. Although FIG. 6 depicts the "powering up" verification being performed first, it should be appreciated that in some embodiments, the "powered down" verification (e.g. blocks 608, 610, 612) may be performed first, prior to powering up the sensor 112.

At 610, after power to sensor 112 is turned off by controller 310, the controller 310 verifies that the output from sensor 112 corresponds to an output from a sensor which is turned off. At 612, if the output from sensor 112 is correct both during the initial powering up period and when not supplied with power, then the method proceeds to block 616, where sensor 112 is again supplied with power and the controller 310 resumes regular operation (e.g. the controller 310 is permitted to send commands to drive 120 to actuate motor 102). In some embodiments, such regular operation may continue for a predetermined period or time or a predetermined number of cycles, at which point the operation of sensor 112 will be verified again prior to allowing door 106 to be moved.

If the output of sensor 112 is not within the expected range at either of blocks 606 or 612, regular operation does not resume. That is, commands to actuate the motor 102 are not sent from controller 310 to drive 120. Method 600 may ensure that sensor 112 is operating correctly prior to allowing for motor 102 to move door 106, and to prevent such motion in the event sensor 112 is malfunctioning. Optionally, an alert may be sent at 614 to inform a user that the sensor 112 is malfunctioning. An alert may, for example, be displayed via any combination of lights 116, display 302, and/or an audible noise via an audio output device.

In some embodiments, method 600 might only be initiated when the door control system 100 has received an instruction to lower or close door 106. In some embodiments, method 600 might be initiated at the beginning of each clock cycle of controller 310, regardless of whether a command is to open or close door 304.

In some embodiments, performance of method 600 may comply with the UL 325 standard. The UL 325 standard prevents safety bypassing (e.g. the use of a jumper wire instead of using a sensor 112) by requiring verification of sensor outputs prior to any cycle in which the door is being lowered or closed. Some may comply with this standard by transmitting continuously rapid power pulses to confirm that the safety sensors are functional, but this is an expensive and technically complex way to comply with UL 325. Instead, in some embodiments, the power to the photoelectric sensor (e.g. sensor 112) is kept off until a request to close or lower door 106 is made. Once a request to close or lower door 106 has been made, the power to sensor 112 is turned on, the corresponding input 1130 to controller 310 from sensor 112 is verified as being inactive (in the time period during which sensor 112 is expected to still be powering up, and then the power to sensor 112 can be turned off, and the corresponding input 1130 to the controller 310 from sensor 112 is verified as being inactive. If this procedure is successful, then the sensor 112 may powered for the entire close cycle. This way, there is no way of bypassing the safety sensor 112, which may ensure compliance with UL 325. As noted above, controller 310 may also verify that the output 1130 of sensor 112 is within expected ranges after the "powering up" period of time has elapsed, as an additional verification of correct sensor 112 operation.

Figure 2B:
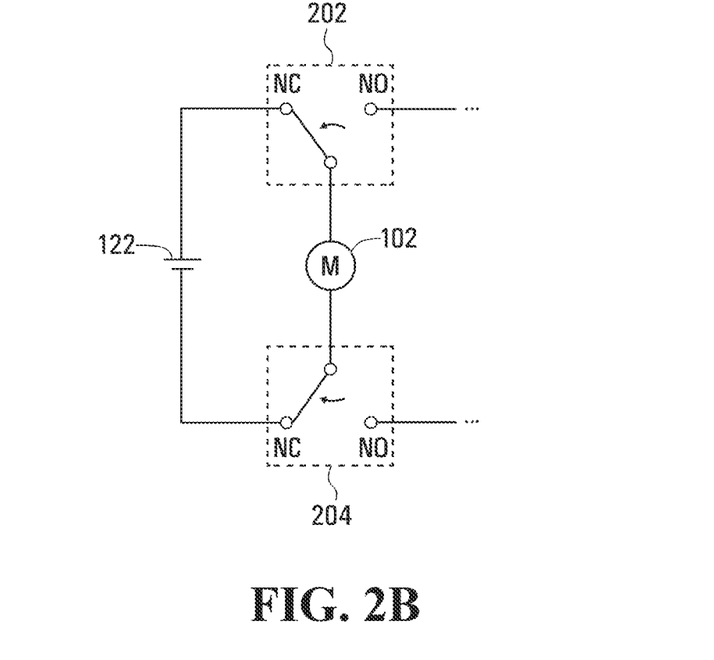
FIG. 2B is a simplified diagram depicting components of an example circuit.

Returning to FIG. 3, in some embodiments, door control system 100 is able to continue to functioning with reduced functionality in the event that power supply 104 is disconnected. As depicted, when power supply 104 is disconnected, relays 200 are no longer being energized by power supply 104, causing relays 200 to connect battery 122 as the power source for certain components in door control system 100. As shown, battery 122 provides power to motor 102, drive 120, as well as open and shut buttons 304, 306. As such, in some embodiments, when power supply 104 is disconnected, battery 122 might not provide power to any of sensor 112, tilt sensor 124, or lights 116, as well as display 302 and stop button 308 on control panel 114. FIG. 2B is a simplified circuit diagram illustrating an example configuration.

As depicted in FIG. 2B, relays 202, 204 may be configured to have a default position (depicted as "normally closed" or NC) in which battery 122 is connected to motor 102 when power supply 104 is unavailable. When power is provided by power supply 104, relays 202, 204 may be energized, thus causing relays 202, 204 to switch to the "normally open" or NO position, in which battery 122 is disconnected from other system components.

When powered by battery 122, the controller 310 in control panel 114 receives power for the components necessary to receive commands from open and close buttons 304, 306 and to send instructions to drive 120 to actuate motor 102. In some embodiments, motor 102 may be instructed directly by controller 310. Unlike full-power operation mode, the battery-powered operation mode does not make use of the predetermined door opening or closing lengths. That is, a single command from a user to open or close door 106 will not cause the door 106 to be opened to a predetermined height. Instead, the door control system 100 might not provide continuous motor function in the absence of active commands from the user.

Figure 8:
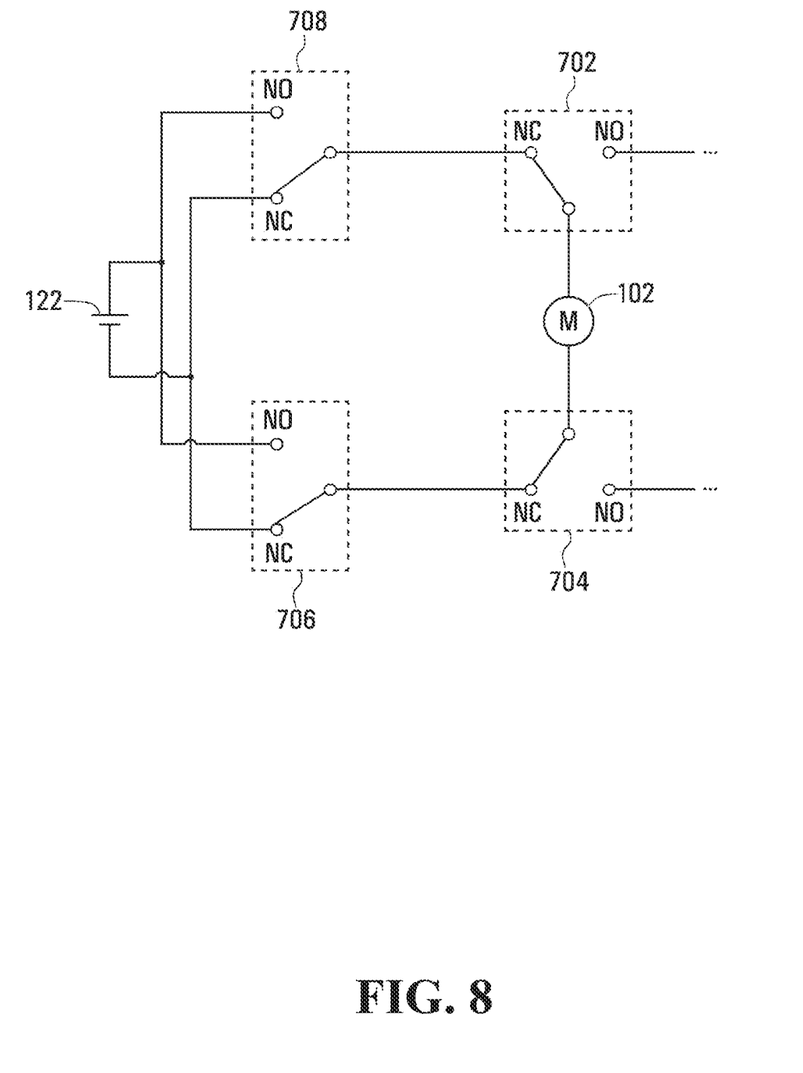
FIG. 8 is a simplified circuit diagram illustrating a configuration enabling reversal of polarity for a DC motor.

In some embodiments, motor 102 is a DC motor. Controlling the direction of operation of a DC motor may be accomplished by reversing polarity of the battery 122 to motor 102. FIG. 8 is a simplified circuit diagram illustrating an example configuration. As depicted, in addition to relays 702, 704 which function similarly to relays 202, 204 in FIG. 2B, the circuit further includes switching elements 706, 708. Switching elements may be, for example, relays, mechanical switches, or the like. As depicted, when switching elements 706, 708 are in the depicted configuration, motor 102 may move in a first direction. When both switching elements 706, 708 are in a second configuration (e.g. 706 and 708 are both in the 'NO' configuration), the polarity of power supplied by battery 122 to motor 102 is reversed, thus enabling rotation (and therefore movement of door 106) in the opposite direction. In some embodiments, switching elements 706, 708 may be single pole, double throw (SPDT) switches. In some embodiments, functionality of switching elements 706, 708 may be provided by a double-pole, double throw (DPDT) switch. In some embodiments, a third configuration is contemplated in which switching elements 706, 708 are not connected to either terminal (which results in no power to motor 102 and no actuation of motor 102). However, it will be appreciated that in the absence of an actuation signal from activation of the up or down buttons, motor 102 would not be enabled to be activated in either direction.

In some embodiments, when powered by battery 122, pressing or activating the open button 304 and then releasing the button 304 will cause the door 106 to be raised for the length of time that the button 304 is activated. When button 304 is released, door 106 will stop being raised. Likewise, when door 106 is open (that is, when the bottom end of door 106 is vertically higher than the bottom of railing 110), pressing the close button 306 will cause the door to descend only while the close button 306 is being activated. The presence of battery 122 allows for the door control system 100 to maintain some basic functionality in emergencies (e.g. when there is a power failure, a lightning strike, or the like). It should be noted that sensor 112 is not powered by battery 122 and as such, method 600 described above might not be carried out by controller 310 while door 106 is being raised or lowered. However, in some embodiments, sensor 112 may be powered by battery 122 (although with continuous motor 102 operation disabled when in battery-powered mode, the likelihood of damage or injury would be lowered, because the user will be manually pressing the buttons 304, 306 in close proximity to the door assembly, without the possibility of the door continuing to move in the absence of active actions by the user).

In some embodiments, door 106 may be said to be "balanced" when the net force of gravity and the tensile force exerted by spring 150 via door shaft 170 on said door 106 is substantially equal to 0. That is, the net force may be 0, which means door 106 can be moved up and down with minimal effort, and will not drift downwards or upwards in the absence of an externally applied force. In some embodiments, static friction may compensate for a slightly imperfectly balanced door 106 and spring combination 150.

It is highly desirable to keep a door control system in a balanced or substantially balanced state with spring 150. In a balanced state, the work performed by motor 102 (and therefore the power consumed by motor 102 during operation) is reduced relative to unbalanced states, because less force (and therefore less energy in the form of work) needs to be applied by motor 102 to cause door 106 to move. It should also be appreciated that a door system can be unbalanced in either direction. For example, an unbalanced state may result in the gravitational force of door 106 being too high (necessitating more power consumption from motor 102 to lift door 106). However, an unbalanced state may also result in the tensile force provided by spring 150 being higher than the weight of the door, which would bias the door 106 to remain open, requiring more power consumption from motor 102 when closing door 106 in order to overcome the tensile force of spring 150.

It is particularly desirable for door control system 100 to be in a balanced state when battery 122 is providing power (rather than power supply 104). As battery capacity is finite, a properly balanced door control system 100 will extend the life of battery 122. Moreover, a properly balanced door control system will extend the life of spring 150, as spring 150 will not be placed under more tension than is necessary and will be less prone to failure. Torsion springs typically used for garage door systems are quite expensive, and cumbersome to repair, and as such, it is particularly desirable to extend the service life of spring 150 for as long as possible to avoid incurring such expense and inconvenience.

When configuring a door control system 100, particularly in the case of retrofitting a motor/drive system to an existing door setup, it is difficult to determine whether the door system is balanced or not. Frequently, motor 102 operates via a gearbox with a high ratio (e.g. 30:1, 40:1, or the like), and it might not be possible to determine whether door 106 and spring 150 are in balance once various components of the drive system are in place. Moreover, any attempts to manually balance the door 106 and spring 150 based on "eyeballing" may not be accurate or dependable.

In some embodiments, door control system 100 may facilitate balancing door 106 and spring 150. In some embodiments, control panel 114 may be configured to display a draw from motor 102 during operation on LCD 302. For example, LCD 302 may display a value of an electrical current used by motor 102 during operation of opening or closing door 106. A current can be measured, for example, by placing a digital ammeter in between two points of a short circuit to measure current, which is then transmitted to controller 310 via I/O interface 406. In other embodiments, controller 310 may include integrated circuitry for measuring, for example, current at various pins or locations.

In some embodiments, door control system 100 may be balanced by observing the magnitude of current drawn by motor 102 during lifting and closing operations. When the current drawn by motor 102 during a lifting operation is substantially equal to the current drawn by motor 102 during a closing or lowering operation, door control system 100 may be balanced. If the magnitude of current drawn by motor 102 is different during lifting and closing operations, spring 150 may be adjusted to vary the tensile force exerted on door 106. In some embodiments, spring 150 may be modified by increasing or decreasing the number of turns. In some embodiments, spring 150 may be adjusted in quarter turn increments. In some embodiments, a set of lining bars may be used to adjust the number of turns in spring 150 gradually.

Figure 9:
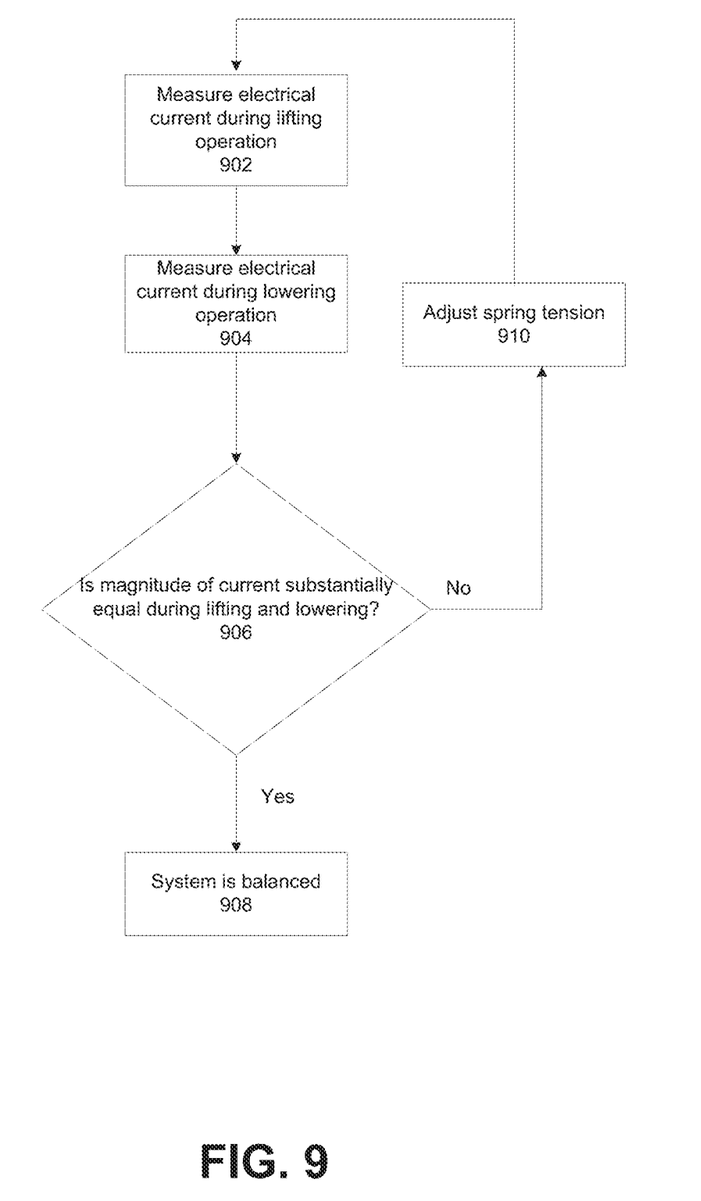
FIG. 9 is a flow chart depicting an example method for balancing a door control system.

FIG. 9 is a flow chart depicting an example method for balancing a door control system 100, in accordance with some embodiments. At 902, a lifting operation is performed and the current used by motor 102 is measured. At 904, a closing operation is performed and the current used by motor 102 is measured. In some embodiments, current may be displayed on LCD 302. In other embodiments, current may be manually measured using an ammeter inserted into the circuit at an appropriate location for measuring the electrical current used by motor 102. At 906, controller 310 may compare the magnitude of the current during opening and the magnitude of the electrical current during lowering. If the magnitude of the currents is substantially equal, then at block 908 the system 100 is determined to be balanced. If the magnitude of currents is not substantially equal, then at block 910, spring 150 may be adjusted by, for example, increasing or decreasing the number of turns or otherwise modifying the tensile force exerted, directly or indirectly, by spring 150 on door 106.

In some embodiments, controller 310 may be configured to display a message on LCD 302 indicating whether said door control system 100 is balanced. In some embodiments, controller 310 may display a message indicating that an adjustment to spring 150 should be made for greater balance. In some embodiments, a suggested adjustment message may indicate whether to increase or decrease the number of turns in spring 150. In some embodiments, a suggested adjustment message may indicate a particular or approximate number of turns to add or remove from said spring 150 to achieve balance.

A further benefit of the systems and methods described herein is that the tension and/or number of turns in spring 150 may be adjusted whenever necessary. For example, over the lifespan of spring 150, there may be a gradual loss of tension through wear a tear. As described herein, differences in current drawn by motor 102 during lifting and lowering operations displayed on LCD 302 may be easily noticed by the user. As such, a door 106 which was initially balanced correctly can be kept in balance with minimal effort and inconvenience. The ease with which the balance of door control system 100 can be maintained may extend the lifetime of various components relative to conventional door control systems. Moreover, when modifications to other components of door control system 100 are made, it is easy for the user to re-establish a balanced state.

Some embodiments of the door control system 100 described herein may offer numerous advantages over known door control systems. For example, some embodiments may provide a convenient way of complying with safety standards (e.g. UL 325) with relatively little inconvenience to end users. Further, some embodiments provide for a robust solution for ensuring continued operation during power outages and other unforeseeable circumstances in which power supply 104 is unavailable. Moreover, some embodiments use brushed DC motors, which are relatively inexpensive and simple to control compared to brushless DC motors and AC induction motors.

As noted above in relation to FIG. 5, control panel 114 includes controller 310. Controller 310 may be any suitable computing device, including a microcontroller, a server, a desktop computer, a laptop computer, and the like. Controller 310 includes one or more processors 402 that control the overall operation of controller 310. Processor 402 interacts with several components, including memory 404, storage 408, network interface 410 and input/output interface 406. Processor 402 may interact with components via bus 412. Bus 412 may be one or more of any type of several buses, including a peripheral bus, a video bus, or the like.

Each processor 402 may be any suitable type of processor, such as a central processing unit (CPU) implementing for example an ARM or x86 instruction set. Memory 404 includes any suitable type of system memory that is readable by processor 402, such a static random access memory (SRAM), dynamic random access memory (DRAM), synchronous dynamic RAM (SDRAM), read-only memory (ROM), or a combination thereof. Storage 408 may include any suitable non-transitory storage device configured to store data, programs, and other information and to make the data, programs and other information accessible via bus 412. Storage 408 may comprise, for example, one or more of a solid state drive, a hard disk drive, a magnetic disk drive, an optical disk drive, a secure digital (SD) memory card, and the like.

I/O interface 406 is capable of communicating with input and output devices such as a display device 302, touch-sensitive devices, touchscreens capable of displaying rendered images as output and receiving input in the form of touches, and buttons 304, 306, 308. Input/output devices may further include, additionally or alternatively, one or more of speakers, microphones, cameras, sensors such as sensors 112 and tilt sensor 124, radio frequency transceivers for receiving and sending commands and acknowledgements to remote control 118, and drive 120. In an example embodiment, I/O interface 406 includes a universal serial bus (USB) controller for connection to peripherals.

Network interface 410 is capable of connecting controller 310 to a communication network. In some embodiments, network interface 410 includes one or more of wired interfaces (e.g. wired ethernet) and wireless radios, such as WiFi, Bluetooth, or cellular (e.g. GPRS, GSM, EDGE, CDMA, LTE, or the like). Network interface 410 enables controller 310 to communicate with other devices, such as a server, via a communications network.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving, at a controller for controlling a motor coupled to a door, a command for actuating said motor to move in a first direction;
   actuating, by said controller, said motor to move in said first direction;
   detecting, by said controller, a first electrical current used by the motor during said moving in said first direction;
   receiving, at said controller, a command for actuating said motor to move in a second direction opposite to said first direction;
   actuating, by said controller, said motor to move in said second direction;
   detecting, by said controller, a second electrical current used by said motor during said moving in said second direction;
   determining, by said controller, whether said door control system is balanced based on said first electrical current and said second electrical current; and
   generating, by said controller, a notification indicating a suggested adjustment to a spring of said door control system when said door control system is determined to be unbalanced.

2. The method of claim 1, further comprising displaying a message on a display of said controller when said door control system is determined to be balanced.

3. The method of claim 1, further comprising displaying said notification on a display of said controller.

4. The method of claim 3, wherein said suggested adjustment is an increase to a number of turns in said spring.

5. The method of claim 3, wherein said suggested adjustment is a decrease to a number of turns in said spring.

6. The method of claim 3, wherein said suggested adjustment includes a quantum of turns to apply to said spring.

7. The method of claim 1, further comprising adjusting, by an operator, a tension in said spring of said door control system in accordance with said suggested adjustment.

8. The method of claim 7, further comprising adjusting said tension in said spring using one or more lining bars.

9. A door control system having a motor coupled to a door, the system comprising:
   a door comprising one or more panels;
   a motor coupled to said door;
   a controller configured to:
      receive a command for actuating said motor to move in a first direction;
      actuate said motor to move in said first direction;
      detect a first electrical current used by the motor during said moving in said first direction;
      receive a command for actuating said motor to move in a second direction opposite to said first direction;
      actuate said motor to move in said second direction;
      detect a second electrical current used by said motor during said moving in said second direction;
      determine whether said door control system is balanced based on a magnitude of said first electrical current and said second electrical current; and
      generate a notification indicating a suggested adjustment to a spring of said door control system when said door control system is determined to be unbalanced.

10. The system of claim 9, wherein said controller is further configured to display a message on a display of said controller when said door control system is determined to be balanced.

11. The system of claim 9, wherein said controller is further configured to display said notification on a display of said controller.

12. The system of claim 11, wherein said suggested adjustment is an increase to a number of turns in said spring.

13. The system of claim 11, wherein said suggested adjustment is a decrease to a number of turns in said spring.

14. The system of claim 11, wherein said suggested adjustment includes a quantum of turns to apply to said spring.

15. The system of claim 9, wherein said controller is configured to determine that said door control system is unbalanced when a magnitude of said first electrical current is different from a magnitude of said second electrical current.

* * * * *